N. C. OVAITT.
PAYING MACHINE.
APPLICATION FILED JULY 31, 1912.

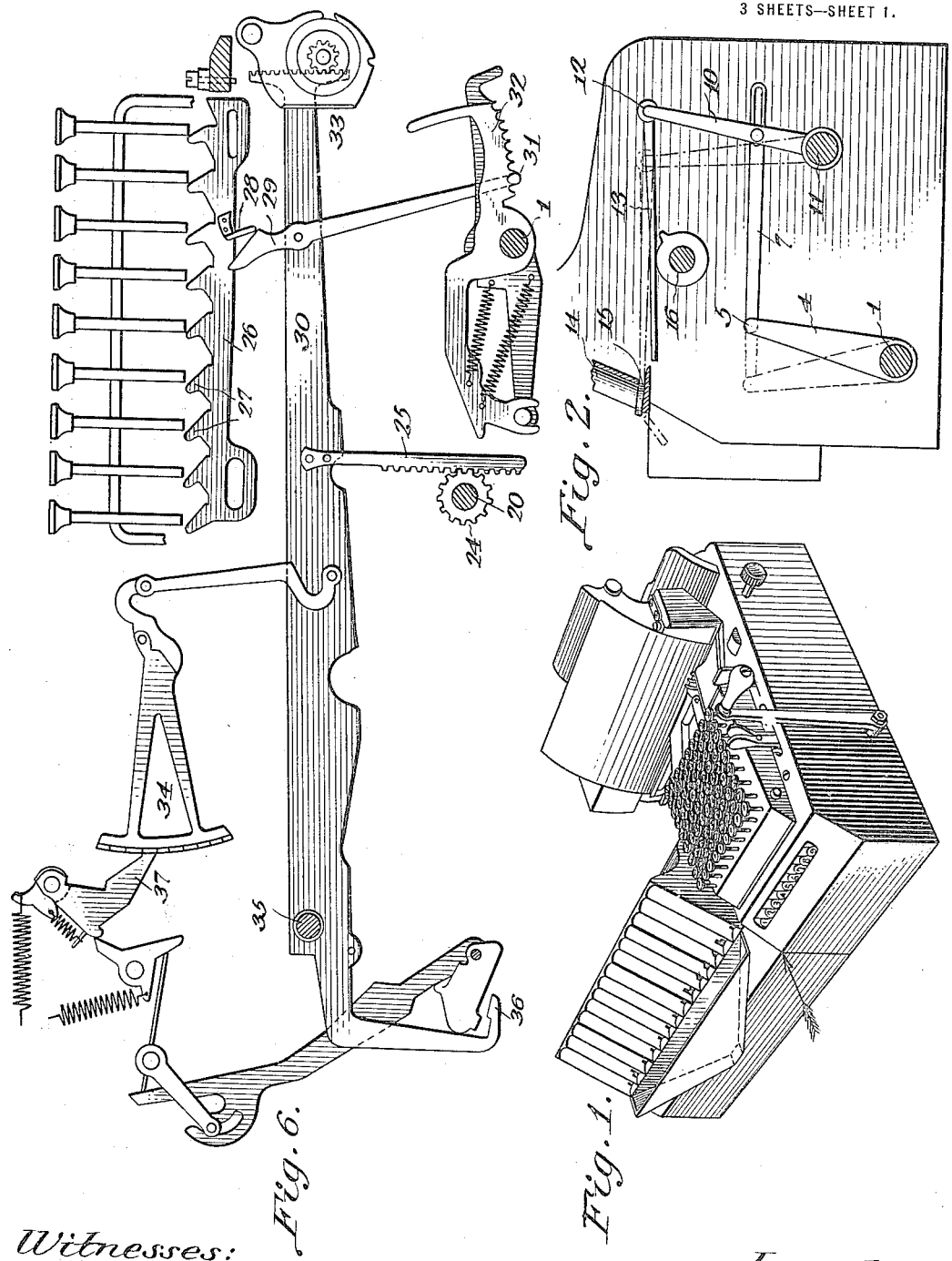

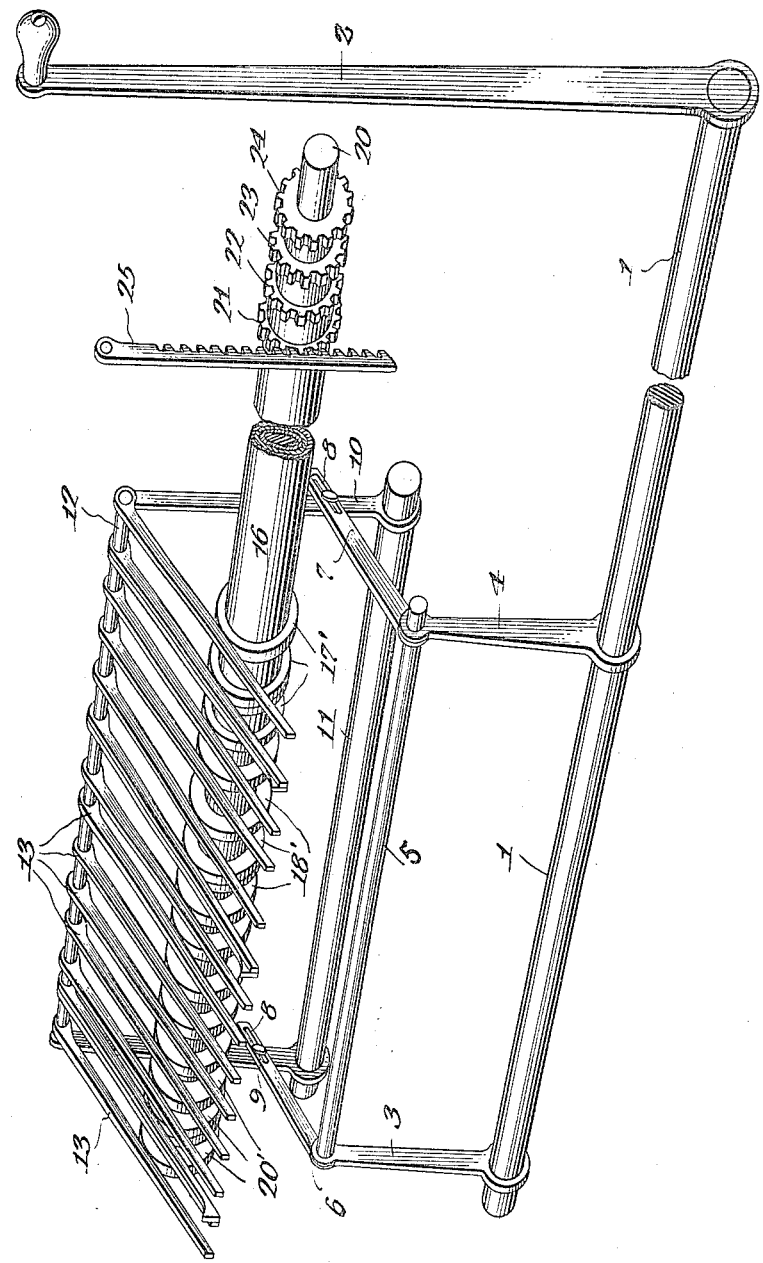

1,231,781.

Patented July 3, 1917.
3 SHEETS—SHEET 3.

Witnesses.
C. J. Schmidt,
A. Van Craenenbroeck.

Inventor:
Nelson C. Ovaitt
By Offield, Towle, Graves & Offield
Attys.

UNITED STATES PATENT OFFICE.

NELSON C. OVAITT, OF DETROIT, MICHIGAN.

PAYING-MACHINE.

1,231,781. Specification of Letters Patent. Patented July 3, 1917.

Application filed July 31, 1912. Serial No. 712,548.

*To all whom it may concern:*

Be it known that I, NELSON C. OVAITT, a citizen of the United States, residing at Detroit, in the county of Wayne and State of Michigan, have invented certain new and useful Improvements in Paying-Machines, of which the following is a specification.

My invention relates to paying machines, and more particularly to a paying machine attachment for adding or accounting machines, or, in other words, it contemplates an inter-working combination of adding or accounting and paying mechanisms which will, by the manipulation of certain keys and levers, count or accumulate, indicate and record totals of, and pay out in coins, the amounts represented by the keys manipulated.

Among the salient objects of my invention are to provide a paying mechanism in combination with adding or accounting mechanism, capable of adding, indicating the totals of, and paying out in coins, the different amounts represented by the keys or members manipulated; to provide a paying mechanism in combination with an adding or accounting mechanism capable of printing, adding and printing totals of, and paying out in coins, the different amounts represented by the keys manipulated; to provide a self-contained paying mechanism as an attachment for an adding or accounting machine, whereby it can be operated through the actuating mechanism of such adding or accounting machine; and, in general, to provide an inter-working combination of indicating, printing, adding and paying mechanisms which will, in a very simple, practical, accurate and economical manner, perform the various functions of the adding or accounting machine and in addition thereto, pay out coins in amounts which may be represented on the keys or members manipulated.

I am not aware that there has ever been produced a paying machine or a paying machine attachment for adding machines whereby it is possible to add and indicate totals of, or to record, add and print totals of, and pay out in coins, the various amounts represented upon the keys thereof manipulated, and I do not, therefore, limit my invention to the particular showing here made, which is for purposes of illustration only, but I claim the invention broadly, knowing that it is possible to embody the invention in other constructions which will be quite as effective in accomplishing the functions mentioned.

Referring now to the drawings,—

Figure 1 is a perspective view of my invention embodied as an attachment to an adding machine, one form of adding machine now on the market having been adopted for purposes of illustrating the invention;

Fig. 2 is an end elevation, partly in section, showing one form of ejector mechanism, as it would appear if the paying machine were cut from the adding machine at the point indicated by the arrow, Fig. 1.

Fig. 3 is a perspective view of said ejector mechanism, showing cam and operating shafts, both of which are projected into the adding machine and operated therefrom;

Fig. 6 is a side elevation of so much of an adding machine mechanism as will illustrate one method of connecting therewith and operating therefrom, a paying mechanism.

Figure 4:
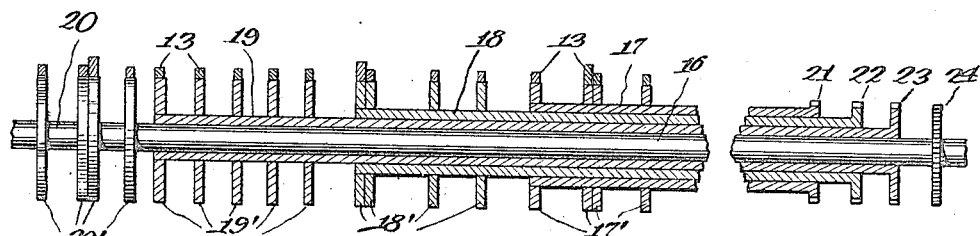
Fig. 4 is a longitudinal sectional view through the cam shafts of the mechanism.

Referring to the drawings, my invention is preferably embodied as a paying machine attachment, of such character that it can be attached to and operated through any of the well-known and practical adding machines upon the market, with very little reconstruction of the latter, and as illustrated in Fig. 1. It is possible, of course, that the invention may be embodied as a complete self-contained paying machine, having operating keys, indicating or counter wheels, recording or printing, adding and ejector, mechanisms, all so constructed and connected that the manipulation of the keys and levers thereof, accumulates, indicates and records totals, and ejects in coins, the amounts represented by the keys manipulated.

The paying mechanism, in the present embodiment of the invention, comprises a coin case having the usual coin racks to receive the coins of different denominations, as illustrated in Fig. 1, said racks being provided at or near their bottoms with openings through the back walls thereof for the ejector members, one form of ejector member being illustrated in Figs. 2 and 3, which I will now describe more particularly.

1 designates an operating shaft mounted in the lower portion of the machine and extended through both the paying attachment and the adding machine proper to receive an operating lever or handle 2. Within the coin case of the device this operating shaft carries two arms, as 3 and 4, connected at their upper ends by a shaft 5. Extended rearwardly from said shaft 5, at or near the arms 3 and 4, are two connecting arms 6 and 7, having their rearward ends provided with longitudinally extending slots, as 8, through which slotted connections are made with arms 9 and 10. Arms 9 and 10 are carried by a supporting shaft 11, and they, in turn, support at their upper ends a carrying shaft 12 upon which are mounted ejector arms or members, as 13. Thus it will be seen that the operation of the lever or handle 2 operates to move forwardly the ejector arm 13, the ends of which are adapted, when raised in a manner which I will describe, to pass through the openings in the back walls of the coin stacks, as indicated in dotted lines at 15, Fig. 2.

I will now describe the mechanism by which I raise the ejector levers or arms 13 into position to be passed through the coin stacks. Referring to Figs. 3, and 4, 16 designates as a whole a cam shaft. This comprises four telescoping shafts or tubes 17, 18, 19 and 20, each carrying near one of its ends a plurality of cam disks or rims, as 17', 18', 19' and 20', and at its opposite end a small pinion, as 21, 22, 23 and 24. These pinions are secured to their respective shafts and said shafts or tubes are adapted to be turned thereby one within the other. The smaller or inner shaft 20 is the longest and carries at one end a pinion 24, and at its other end four cam disks or rims 20', Figs. 4 and 5. The shaft or tube 19 is somewhat shorter at both ends than the shaft 20 and carries at one end the pinion 23, and at its other end five cam disks or rims 19'. The shaft 18 is shorter at both ends than shaft 19 and carries pinion 22 and at its opposite end four cam disks or rims 18'. The shortest and outer tube or shaft 17 carries at one end pinion 21 and at its opposite end four cam disks 17'. Each shaft or tube is capable of being turned through the pinion independently of the others. There are seventeen cam disks or rims and these, with their supporting shafts, are mounted beneath the ejector arms 13, as clearly indicated in Figs. 3 and 4. The ejector arms are shown in cross section, resting upon the cam disks, in Fig. 4.

Figure 5:
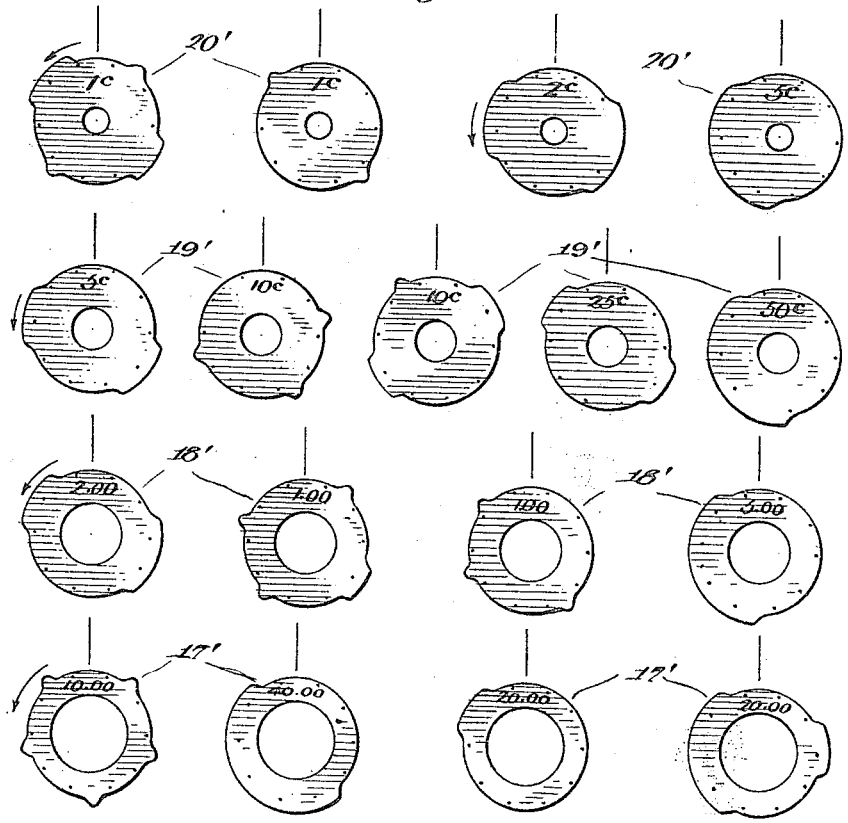
Fig. 5 shows the several groups of cam disks or rims which are mounted upon the cam shaft.

The cam disks or rims, referring to Fig. 5, are provided upon their peripheries with cam portions or projections so arranged and distributed and of such extension that when the respective shafts are turned to different positions, certain cams are brought uppermost upon the disk and operate to raise the ejector lever or arm resting thereupon into such position that when it is moved forwardly by means of the handle or lever 2, the ejector arm passes through the coin rack and pushes the coin off into the spout, shown in Fig. 1.

I will now describe how these cam shafts are operated. The ends thereof which carry the pinions are projected into the adding machine so that, for example, pinion 24 on shaft 20 comes beneath the first row of keys from front to rear at the right-hand side the key-board, as represented in Fig. 1, there being nine keys in each row representing the numerals 1 to 9. The pinion 23 stands under the second row of keys; the pinion 22 stands under the third row of keys; and the pinion 21 stands under the fourth row of keys from the right hand side of the machine. These various pinions are operated or turned by four downwardly extending racks, as 25, Fig. 6, which mesh therewith. I have shown a side view in Fig. 6 of the first or right-hand row of keys and the mechanism connected therewith and operated thereby, in order to illustrate how the operation of the keys, in addition to operating the usual indicating, recording or printing mechanism, also operates the pinions which turn the cam shafts and raise the ejector arms or members into position to eject the coins which it is desired to pay out.

The mechanism represented in Fig. 6 is not new and forms no part of my invention, but represents mechanism most of which is old and in common use in adding machines. In order to show the dependent operation between the keys of an adding machine and the paying mechanism, and how the latter is operated therefrom, I will briefly describe the portion of the mechanism shown in Fig. 6.

Each row of nine keys rests upon a movable slide bar or member, as 26, provided with nine upwardly projecting cam portions, as 27, each having an inclined cam face. These cam faces are of different length and incline, corresponding with the different denominations represented by the different keys resting thereupon, there being an inclined cam face for each key, whereby as a key is pressed the slide bar 26 is moved longitudinally a distance depending upon the denomination of the key pressed.

Mounted upon the slide bar 26 is a laterally projecting finger 28, engaging the inclined face of a swinging arm or link 29, pivoted to an operating arm or lever 30. The lower end of the swinging arm 29 is provided with an engaging pin or hook, as 31, adapted to be moved or swing under a notched rocker arm 32, mounted upon and operated by the main shaft 1, and provided with nine notches corresponding with the nine keys and nine inclined cam members 27. As the slide bar 26 is moved rearwardly, the swinging arm 29 is moved proportionately so that the lower end 31 thereof is moved to a corresponding notch therein. Now when the main shaft 1, upon which the rocker arm 32 is mounted, is turned by means of the handle 2, the rocker arm 32 is moved downwardly engaging the connecting arm 29 in its previously set position, whereby the operating member or lever 30 is moved downwardly a pre-determined distance, depending upon the distance from the shaft 1 the rocker arm 32 is engaged. The operation of these members 30 operates numeral or indicating wheels, as at 33, in the usual manner. They also operate type bats or segments, as 34, while the continued downward movement of the member 30 upon its fulcrum or pivot at 35, trips, at its rearward end 36, the connecting mechanism between it and a hammer 37 and permits the latter to be operated against the type segment 34, for the purpose of recording the amount manipulated upon the keys. As this particular mechanism forms no part of my invention, but is adopted for illustration purposes only from United States Patent No. 749,177, of January 12, 1904, (granted to one D. E. Felt) I will not more particularly describe the indicating, printing and adding mechanism thereof, but make reference to the patent mentioned for a further description and illustration of this particular mechanism. The present embodiment of my invention is capable of attachment to and operation from any adding machine having movable parts, the movement of which is variable according to the denomination of the key pressed.

The racks 25, which operate the pinions and turn the cam shafts, are connected with such movable members, here represented as 30, whereby the downward movement thereof operates to move proportionately the rack 25, which in turn operates to rotate the pinions and cam shafts and raise the ejector arms corresponding to the keys manipulated.

Referring now to Figs. 4 and 5, I will describe the manner in which the cam shafts operate to raise the ejector levers or arms. The first row of cam disks, shown in Fig. 5, are those carried by the inner shaft 20, in Fig. 5, which said shaft and cams are turned through pinion 24. The second row of cams, 19', are those carried by shaft 19, there being five of them, which shaft 19 and cams 19' are operated through pinion 23. The third row of cams 18' are those carried by the shaft 18 and are operated through pinion 22, while the last row of cams 17' are those carried by shaft 17 and are operated through pinion 21. I have indicated on the cam disks shown in Fig. 5 the denomination of each disk. With the combination shown it is possible to pay out any sum up to $99.99 with the machine here described. All cam disks upon each shaft are secured to and turned with the shaft, said shafts turning freely one within the other. The cam portions upon the different disks are so arranged and of such extent that any combination of numbers within the amount mentioned can be obtained. This is accomplished in the following manner:

The cam disks in the present showing turn from right to left in the direction indicated by the arrow, Fig. 5, while in Fig. 4 they turn forwardly, that is, the upper portion of each cam comes forwardly and downwardly. Each disk is divided into nine equal portions, indicated by the dots, corresponding to the nine keys in each row. The cams proper are distributed upon the peripheries of these disks so that a cam portion will come to the uppermost position, represented by the short vertical lines, Fig. 5, and when in this position will raise the ejector arm resting upon the cam disk, as indicated in Fig. 3. The cams are indicated on the disks of Fig. 5 only. Thus the pressing of the 1¢ key on the adding machine, referring now to Fig. 2, would rotate the cam shaft one point which would raise the ejector arm 13 into the position indicated in dotted lines, so that when the main shaft 1 is operated, said ejector arm would be moved forward to perform its function of pushing out the coin.

Referring to Figs. 3 and 4, it will be seen that some of the ejector arms are of double thickness and work alongside a single thickness arm within one coin stack, there being a double opening in the back wall of the coin rack, as indicated in Fig. 1. One arm will push out a single coin and the other arm will push out two coins from the same rack. The relative positions and thicknesses of these disks and ejector arms may be seen in section in Fig. 4.

The manipulation of any of the first row of keys of the adding machine operates through pinion 24 to turn proportionately to the key-manipulated shaft 20 and the four cam disks carried thereby. This operation may be briefly described as follows:

The manipulation of the one-cent-key operates the inner shaft and turns the four cam disks thereupon one point, whereupon the cam of the first disk comes to the uppermost position and raises the ejector arm resting thereupon.

The manipulation of a two-cent-key operates to turn the same shaft two points distance and brings the cams on the third disk of the row into the uppermost position, this position on the other disks being blank.

The manipulation of the three-cent-key operates to turn the same shaft three points and brings the cams of disks 1 and 3 uppermost, lifting the first single ejector arm and also the double ejector arm, so as to eject two cents out of one rack and one out of the other.

The manipulation of the four-cent-key operates to turn the same shaft four points and brings cams on the second and third disks into operating position.

The manipulation of the five-cent-key operates the same shaft and brings the cam on the fourth or nickel disk into operating position.

The manipulation of the six-cent-key operates the same shaft, bringing cams on the first one-cent disk and the nickel disk into operating position.

The manipulation of the seven-cent-key operates to bring cams on the third or two-cent disk and the fourth or nickel disk into position.

The manipulation of the seven-cent-key operates to bring cams on the two-cent disk and on the five-cent disk into position.

The manipulation of the eight-cent-key operates to bring cams on the first, third and fourth disks into operating position.

The manipulation of the nine-cent-key operates the same shaft and brings cams at the ninth division of all four disks into operating position.

The operation of the other rows of keys gives the same result, paying out larger denominations. Thus if it is desired to pay out $25.30, the "2" in the fourth row from the right-hand side of the machine, the "5" key in the third row, the "3" key in the second row would be pressed, these four rows from the right-hand side of the machine representing units, tens, hundreds and thousands. The corresponding cams would come into the uppermost position and the result would be that a $20.00 gold piece, a $5.00 gold piece, a 25¢ piece and a nickel would be ejected by the manipulation of the ejector levers through the handle 2.

I wish to call attention to the pin and slot connection between the connecting arm 7 and the arm 10, Figs. 2 and 3. By this arrangement, the operating handle 2 can be moved sufficiently to cause the operation of the indicating, recording and adding mechanism, shown in Fig. 6, before the ejector arms are started forward, so that the indicating and recording is completed before the ejector arms move forward. The continued movement of the handle 2 then brings the ejector arms forward and ejects the coins wherever an ejector arm is raised, as will be understood by reference to Fig. 2. The ejector arms which are not raised by cams, move forward with the others, but they pass beneath the coin rack.

I am aware that the spirit of my invention can be carried out in various mechanisms wherein a working connection and coöperation between adding machines and paying machines, is had, and I do not, therefore, limit my invention to the form of paying machine, not the form of adding machine here shown for purposes of illustration, but claim as my invention any machine or combination covered by the claims herein, considered in their broadest sense.

I claim as my invention:

1. In a paying machine, the combination of a plurality of coin magazines, a series of ejector arms for delivering coins from said coin magazines, a bail to which said ejector arms are pivotally connected and for moving said arms simultaneously, a rotatable shaft parallel with the bail and provided with cam projections for elevating said arms into operative relation to the coins in the coin magazines, a series of depressible keys of different denominations, a shift bar controlled by said keys, a lever, a subsidiary lever pivoted on the first lever and controlled by the shift bar, means connecting the first lever with the rotatable shaft whereby pivotal movement of said lever will result in rotation of said shaft, and a common actuating member for said bail and said second lever whereby an operative movement of said common actuating member will effect movement of the second lever to actuate the first lever and said shaft and will move the bail controlling said ejector arms.

2. In a paying machine, the combination of a plurality of coin magazines, a series of ejector arms for delivering coins from said coin magazines, a bail to which said ejector arms are pivotally connected and for moving said arms simultaneously, a rotatable shaft parallel with the bail and provided with cam projections for elevating said arms into operative relation to the coins in the coin magazines, a series of depressible keys of different denominations, a shift bar controlled by said keys, a lever, a subsidiary lever pivoted on the first lever and controlled by the shift bar, means connecting the first lever with the rotatable shaft whereby pivotal movement of said lever will result in rotation of said shaft, and a common actuating member for said bail and said second lever whereby an operative movement of said common actuating member will effect movement of the second lever to actuate the first lever and said shaft and will move the bail controlling said ejector arms, a pin-and-slot connection being included in the actuating connection between said bail and said common actuating member whereby the rotatable shaft will be actuated ahead of the ejector arms.

3. In a paying machine, the combination of a shift bar, a series of depressible keys, each being adapted to shift said bar a different distance, a stationary pivot, a lever pivoted thereon, a double-ended lever pivoted on said first lever and adapted to be rotated by a movement of said shift bar, an actuating shaft, an arm on said shaft adapted to be engaged by said pivoted lever at varying distances from the center of said actuating shaft, a series of coin magazines, ejector arms for delivering the coins therefrom, an actuating bail for said arms on which the latter are independently pivotally mounted, a cam shaft provided with projections adapted to raise said arms into operative relation to the coins in the magazines, a rack-and-pinion connection between said cam shaft and said first mentioned lever whereby movement of said lever will rotate the cam shaft, and an actuating connection between said actuating shaft and said bail, the arrangement being such that movement of said actuating shaft will move the first mentioned lever through the pivoted lever mounted thereon, thereby rotating the cam shaft and will subsequently move the ejector arms to deliver coins from the magazines.

4. In a paying machine, the combination of a shift bar, a series of depressible keys, each being adapted to shift said bar a different distance, a stationary pivot, a lever pivoted thereon, a double-ended lever pivoted on said first lever and adapted to be rotated by a movement of said shift bar, an actuating shaft, an arm on said shaft adapted to be engaged by said pivoted lever at varying distances from the center of said actuating shaft, a series of coin magazines, ejector arms for delivering coins therefrom, an actuating bail for said arms on which the latter are independently pivotally mounted, a cam shaft provided with projections adapted to raise said arms into operative relation to the coins in the magazines, a rack-and-pinion connection between said cam shaft and said first mentioned lever whereby movement of said lever will rotate the cam shaft, and an actuating connection between said actuating shaft and said bail, the arrangement being such that movement of said actuating shaft will move the first mentioned lever through the pivoted lever mounted thereon, thereby rotating the cam shaft, and will subsequently move the ejector arms to deliver coins from the magazines, the actuating connection including a pin-and-slot connection whereby the cam shaft is actuated ahead of the ejector arms.

NELSON C. OVAITT.

Witnesses:
C. C. GAINS,
E. M. WEBER.

Copies of this patent may be obtained for five cents each, by addressing the "Commissioner of Patents, Washington, D. C."